Patented June 16, 1936

2,044,704

UNITED STATES PATENT OFFICE 2,044,704

ELECTROLYSIS OF WATER

Albert Edgar Knowles, London, England

No Drawing. Application March 29, 1935, Serial No. 13,782. In Great Britain February 21, 1934

8 Claims. (Cl. 204—9)

The invention relates to a method and apparatus for the concentration of heavy water in the electrolysis of water.

The discovery has been made that ordinary water contains a minute proportion of a "heavy" water and that in electrolytic cells which have been in use for some time decomposing water by electrolysis the proportion of heavy water present in the electrolyte has considerably increased. This proportion goes on increasing as electrolysis proceeds, but the amount of heavy water passing out as vapour with the gases and the trace of the corresponding heavy hydrogen produced by the electrolysis of some of the heavy water also increases as the concentration of heavy water in the cell increases. Accordingly the proportion of heavy water in the cell reaches a maximum value when the amount leaving the cell as vapour and heavy hydrogen equals the amount of heavy water contained in the incoming feed water.

With fresh feed water under normal conditions this proportion of heavy water in the electrolyte appears not to exceed five times the amount in the original water.

It has been proposed to carry on the electrolysis by starting with a very weak electrolyte and decomposing without the addition of water until the electrolyte becomes very concentrated.

Such a method of concentration is not economical because, during the major portion of the time, the electrolysis will require an excessive voltage.

As the major portion of the loss of "heavy" water in a cell working normally is that carried off in the water vapour present in the outgoing oxygen and hydrogen gases, and only a small portion is due to the decomposition of "heavy" water into "heavy" hydrogen and oxygen, I condense the vapour by cooling the gases from each cell or series of cells before washing and use this condensate as feed to another cell or series of cells. In this case further concentration takes place. The amount of condensate in proportion to the amount of water decomposed can be adjusted by controlling the working temperature of the cells and the temperature of the condenser. It is found that by an increase in temperature above the normal the amount of condensate is considerably increased. In this way the electrolyte can be maintained at constant concentration and therefore at maximum efficiency and the concentration of the "heavy" water takes place without interfering with the normal working of the cell or cells.

Again I use the condensate from the second cell or series of cells as feed to a third cell or series of cells. I repeat this operation as often as may be necessary to produce a concentrated "heavy" water condensate.

For instance experiment and calculations show that it is possible to concentrate the "heavy" water five times at each operation. If then the original water contained one part in five thousand the first condensate might contain one part in one thousand the next one part in two hundred the next one part in forty and the next one part in eight.

In practice such figures cannot be obtained because as the concentration increases the amount of "heavy" water decomposed in the electrolysis also increases, giving a larger proportion of "heavy" hydrogen in the outgoing gas. It will therefore be easier to aim at a smaller concentration per operation and to increase the number of operations.

I have for convenience described the method of working as "operations" but it must be understood that it is not necessary to work the cell or series of cells intermittently. By continuous working with constant feeds in suitable apparatus the same effects can be obtained.

In carrying out this method I propose to use any type of cell but prefer to use that which has become associated with my name. The cell must have:—(1) means for controlling the temperature (2) ample capacity for the deposit of electrolyte spray (3) condensers for cooling the gases and collecting the condensate before washing (4) washers for washing the gases with the incoming feed. I prefer to have the condensers to each cell but they may be to a group of cells. I prefer to have the washers to the groups or series of cells but they may be to each cell.

The condensate from each concentration passes to a storage tank for feeding the next concentration. For carrying out the washing and feeding I prefer the arrangements described in my British Patents 219,381, 261,164, 320,388 and 335,987.

It has been found that "heavy" hydrogen combines with water yielding "heavy" water and an equivalent quantity of "light" hydrogen, so in order to recover some or all of the "heavy" hydrogen which comes off with the "light" hydrogen in the electrolysis, the washed hydrogen gases may be further brought into intimate contact with the feed water in any suitable form of apparatus. There are many suitable forms in use in ordinary gas works such as coke-filled-towers, and mechanical scrubbers.

From the later operations, when the outgoing hydrogen gas mixture contains a considerable proportion of "heavy" hydrogen, the gas mixture can be liquefied and the gases separated for use by fractional distillation in the usual manner. The high quality "heavy" hydrogen separated can be burnt in air and the products condensed, yielding almost pure "heavy" water.

On the other hand, the concentrated "heavy" water can be decomposed by electrolysis yielding "heavy" hydrogen and oxygen.

I claim:—

1. Process for the concentration of heavy water by successive stages, the process in each stage consisting in decomposing water by electrolysis, condensing the water vapour carried off by the gases from each cell or series of cells, which effect the decomposition in that stage, collecting this condensate, and using it as the sole feed to the cell or cells in the next stage of concentration.

2. The process of producing concentrated heavy water from normal water which contains traces of heavy water by electrolysis in successive stages, the process in each stage consisting in decomposing the water by electrolysis in a cell or series of cells which form one stage, condensing the water vapour and spray carried off by the gases from these cells, controlling the amount of this condensate by varying the temperature of these cells, collecting this condensate and using it as the sole feed to the cell or cells in the next higher stage of concentration.

3. The process of producing multi-stage concentration of heavy water the stages comprising decomposing water by electrolysis, condensing the water vapour carried off with the gases from each electrolytic cell, feeding this condensate to the cells in the next stage, and washing the gases leaving the cell or cells with the incoming feed water for the first stage.

4. The process of producing the concentration of heavy water by successive stages, the stages comprising the electrolysis of water, the condensation of the water vapour carried off with the gases from each cell, or series of cells, using this condensate as the main feed to the cell or cells in the next stage of concentration, washing the gases leaving the first cell with the incoming feed water for said cell, and bringing the washed hydrogen gases into intimate contact with feed water in order to recover heavy hydrogen passing off with the hydrogen gas.

5. The process of producing multi-stage concentration of heavy water in feed water containing a mixture of normal water and heavy water which consists in supplying the feed water to the first stage of the process, subjecting the feed water at such stage to electrolysis to produce hydrogen and oxygen gases containing vapour from the feed water, condensing said vapour and using the condensate to form the feed to the next stage of the process, repeating the steps of electrolysis, condensation and feeding the condensate for each succeeding stage, liquefying the hydrogen gases from the latter stages of the process, and fractionally distilling the liquefied gases to separate the heavy and normal hydrogen.

6. The process of producing multi-stage concentration of heavy water in feed water containing a mixture of normal water and heavy water which consists in supplying feed water to the first stage of the process, subjecting the feed water at such stage to electrolysis to produce hydrogen and oxygen gases containing vapour from the feed water, condensing said vapour and using the condensate to form the feed to the next stage of the process, repeating the steps of electrolysis, condensation and feeding the condensate for each succeeding stage, liquefying the hydrogen gases from the latter stages of the process, fractionally distilling the liquefied gases to separate the heavy and normal hydrogen, causing the separated heavy hydrogen to combine with oxygen and thereby to produce heavy water vapour, and condensing the produced heavy water vapour.

7. The process of producing concentration of heavy water in a quantity of a mixture of normal water and heavy water which consists in subjecting the mixture to electrolysis to produce hydrogen and oxygen gases containing watery vapour from the mixture, condensing the watery vapour, using the condensate as the feed to a second stage, subjecting this condensate which forms the mixture in the second stage to electrolysis to further concentrate the heavy water, repeating the foregoing steps of the process through several succeeding stages, and subjecting the final concentrate to electrolysis to produce heavy hydrogen and oxygen.

8. The process of producing multi-stage concentration of heavy water in feed water containing a mixture of normal water and heavy water which consists in supplying the feed water to one stage of the process, subjecting the feed water at such stage to electrolysis to produce hydrogen and oxygen gases containing vapour from the feed water being electrolyzed, condensing said watery vapour, using the condensate as the main feed water for the next succeeding stage, using this feed water to wash the gases leaving said next succeeding stage, repeating the foregoing steps of the process through several succeeding stages, and subjecting the final concentrate to electrolysis to produce heavy hydrogen and oxygen.

ALBERT EDGAR KNOWLES.